May 3, 1960 E. HANSET 2,934,777
PLASTIC BROOM OR BRUSH AND METHOD OF FABRICATION
Filed April 4, 1955 2 Sheets-Sheet 1
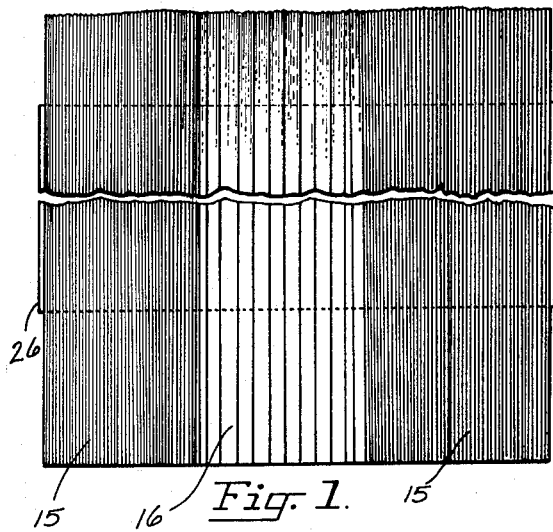
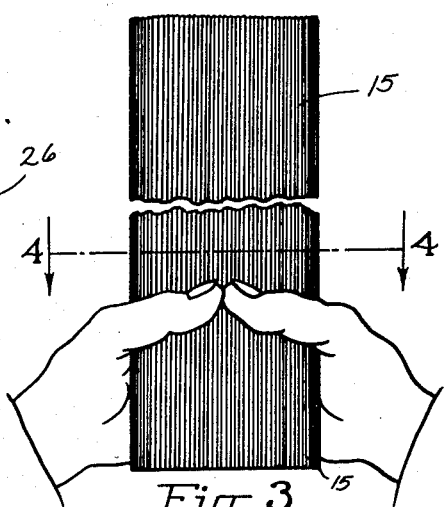
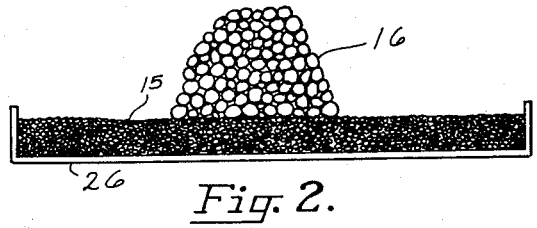
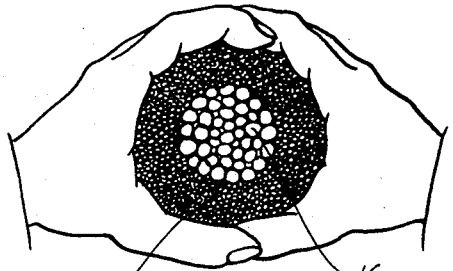
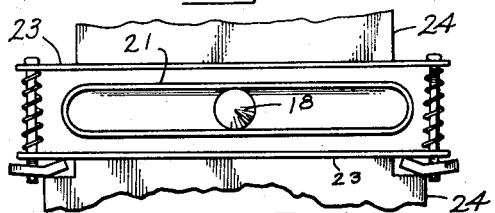
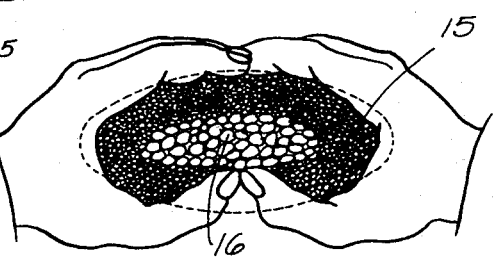
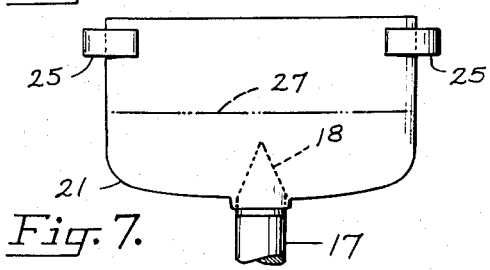
INVENTOR.
Eugene Hanset
BY
Atty.

May 3, 1960            E. HANSET            2,934,777
PLASTIC BROOM OR BRUSH AND METHOD OF FABRICATION
Filed April 4, 1955            2 Sheets-Sheet 2
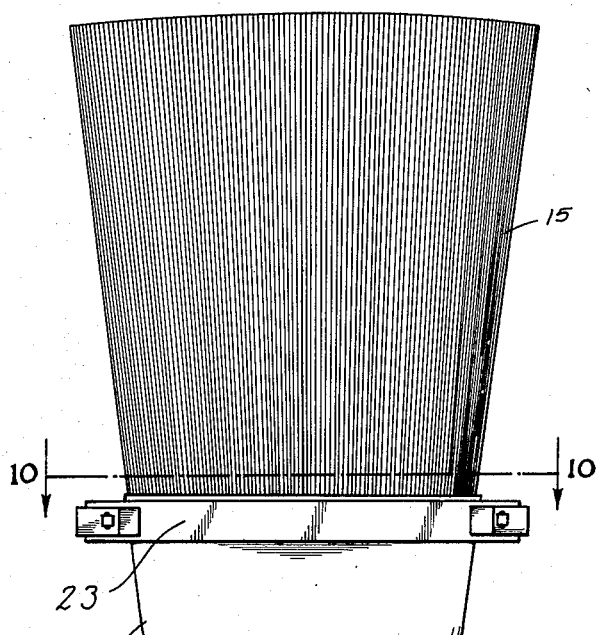
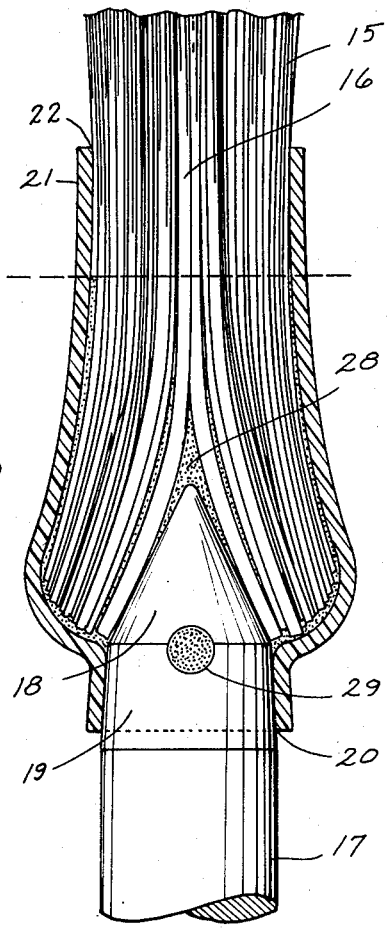
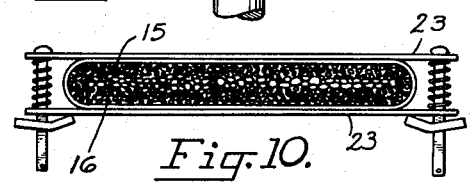
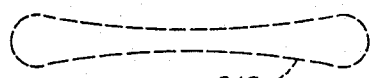
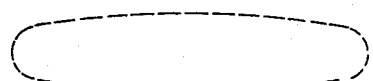
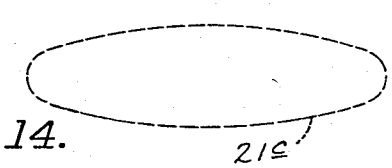
INVENTOR.
Eugene Hanset

United States Patent Office 2,934,777
Patented May 3, 1960

2,934,777

PLASTIC BROOM OR BRUSH AND METHOD OF FABRICATION

Eugene Hanset, Portland, Oreg.

Application April 4, 1955, Serial No. 498,863

5 Claims. (Cl. 15—171)

This invention relates to the manufacture of brooms, brushes, and similar articles and has, as a primary objective, the provision of a stronger, a more beautiful, and a less expensive article and the provision of a method for securing the handle to the fibers or broomcorn during the production of the article.

At the outset, it will be understood that the full scope of the instant invention encompasses not only brooms but also brushes and other similar products where fiber, yarn, filament, or the like is attached to a handle. For purposes of illustration, however, the following disclosure is made primarily with relationship to a household or an industrial broom, this particular exemplary disclosure being a familiar segment of the broom and brush art and one which adequately illustrates the advantages of my invention.

Even today, a vast majority of all household and industrial brooms are hand made in small regional shops and plants by skilled artisans called broom makers. Conventionally, these men build up a broom about a handle by employing a continuous length of wire which binds successive layers of broomcorn tightly to the handle. Once the basic structure of the broom has thus been assembled, it is stitched and trimmed prior to sale. Because a major portion of the cost of a finished broom is a labor cost, the industry long has sought a machine or a more efficient method of production in order to speed production and lower the cost. To this end, the instant invention provides a method for making brooms substantially four times as fast as the conventional hand method and it further provides a finished product which is stronger, more beautiful and longer lasting than the conventional hand made broom.

In essence, my method utilizes a one time cup-shaped mold of flexible plastic material which, after fabrication, becomes the cover and shoulder of the broom. It further utilizes a casting resin such as a thermosetting polyester or the like, mechanically to bond one end of a bundle of the broomcorn or the fibers into a relatively rigid head within the cup-shaped mold and cover member and directly to the handle without using wire, thread, or other supplementary fastening structure. In this connection, I am aware that previous attempts have been made to form brooms with plastic injection molding and/or with various types of glues. The instant method and finished article, however, are an improvement upon these previous attempts as now will be described.

To the above end, one plastic broom which enjoyed a recent transient vogue was cast utilizing multiple cavity metal molds, one cavity to each broom. With the mold, plastic injection was employed to bond the fibers together in a solid, broom shaped mass, the liquid plastic being cured to a solid having a hole into which the handle later was fitted. Several disadvantages, of such magnitude that consumer acceptance could not be attained, made evident the impracticality of this type of broom. One such disadvantage was that it was considered essential that a polystyrene plastic be employed. At low temperatures, however, the polystyrene became brittle and shattered. The broom thus was of utility indoors but was of substantially no utility outdoors in cold weather. Another disadvantage was that the nature of the plastic employed required the use of synthetic filaments, such as nylon. Where the conventional broomcorn was employed, it was found that a chemical reaction resulted. This partially dissolved and thus seriously weakened the fibrous structure of the corn and thus dictated the use of the more expensive synthetic fibers. In fact, the broom market is so price sensitive that nylon filament substantially prices a broom off the market. As a further disadvantage, the use of metal molds to cast the plastic and hold the fibers required a large capital investment in molds alone. This was true since a broom manufacturer must turn out a large quantity of brooms if he is to keep the unit cost to a reasonable figure. In the prior art attempts under consideration, this required the purchase and upkeep of a large number of individual molds, each of which was tied up while the plastic was setting. Finally, as another disadvantage, the handle was not always secure since it was added and most often was secured with only a force fit. The instant invention eliminates each and every one of the above described disadvantages.

A second type of broom which is related somewhat to the instant invention consists of either a metal or a plastic shoulder to which the broomcorn or fibers are glued. The shoulder itself carries a ferrule into which the handle is inserted after the fibers have been glued to the inside of the hollow plastic shoulder. With this particular broom, the handle easily can come loose as the plastic expands in warm weather. Further, to hold the fibers in place, the shoulder which is employed must be of superior structural strength. Still further, if such a broom is dipped in hot water or in certain types of solvents, the glue will soften or dissolve thereby releasing the broomcorn or fibers and destroying the utility of the broom. As another disadvantage, a broom which is made with corn by this glue process can utilize only the fines and not the stocks. The rigid shoulder, which shoulder imparts the needed structural strength to the finished broom, will not yield and thus does not allow the use of corn with the stocks attached. As will be evident, when the stocks and fines are mixed in a conventional hand made, sewn broom, the stocks must be placed within a surrounding mass of fines and covered up. To utilize only fines is to increase the cost of the broom and to restrict the length of the sweep. To coin an analogy, the use of the fines only is somewhat like eating only the steak and throwing away the rest of the steer. Here again, my invention is an improvement upon the above structure and method of fabrication.

One object of the instant invention is to eliminate each of the disadvantages of the above mentioned glued broom and, simultaneously, to allow the use of broomcorn in the same proportions as it is grown and now is used in handmade brooms. This latter objective and advantage is of particular utility when the machinery and method of the instant invention are to be installed and practiced in one of the existing broom factories to convert the production thereof to the plastic broom of my invention.

Another object of my invention is to provide a method for securing a handle directly to the fibers of a broom or brush. I accomplish this objective by employing a hollow i.e., cup-shaped flexible plastic mold and cover member of but one time used which becomes an integral part of the finished broom. A polyester casting resin is poured into this mold and cover member so as directly to contact both the handle and one end of a bundle of the fibers of the broom. Thus, the finished product provides what is substantially an integral handle fiber structure, Yet another object of my invention is to provide a method for forming a plastic broom utilizing substantially the same proportions of broom corn stocks to fines as is utilized in a conventional handmade, wire bound broom. A correlated objective is to provide a method of gathering or arranging the stocks and fines of broomcorn within a mold containing a liquid casting resin such that the stocks will be hidden within a surrounding mass of fines, as with the conventional handmade broom, when the resin sets up.

Still another object of my invention is to provide a method for bonding fibers such as broomcorn to a wood handle through the medium of a casting resin so as to increase the strength of the finished product.

Another object of my invention is to provide a broom in which an elongated handle is bonded to the fibers of the broom by a solidified mass of thermosetting polyester casing resin which encompasses and is in intimate contact with the end portion of the handle and with each of the broom fibers. A correlated objective is to utilize a casting resin which is substantially unaffected by heat, cold, solvents, acids and the like so the broom or brush can be used under varying conditions.

Another object of my invention is to provide a broom or brush in which the handle and fibers are bonded with a mass of resin, which resin is not bonded to the shoulder of the broom, yet in which the transversely enlarged bulbous shape of the solidified resin is such that the shoulder cannot come loose from the broom and thus defines a bumper or guard.

These and other objects and advantages of my invention will become apparent during a consideration of the following detailed description, taken in conjunction with the accompanying drawings, wherein:

Figs. 1 and 2 are related top and end views of a pile of broomcorn fines having a mound of broomcorn stocks arranged thereon, the latter figure having direction arrows which indicate a gathering motion;

Figs. 3 and 4 are related top and section views showing the manner in which the fines are gathered around the stocks to define a substantially cylindrical mass with the stocks in the middle and the fines around the outside;

Fig. 5 is a detail view showing a vise which may be used to compress the shoulder of the broom and, simultaneously, to close a clamp thus holding the shoulder in the compressed position while the casting resin cures;

Fig. 6 is a detail view showing two side acting compression jaws gripping the ends of a plastic shoulder mold so as to open the mouth and allow the broomcorn to be inserted;

Fig. 7 is a side detail of the structure shown in Fig. 6, a broken line indicating the height to which the casting resin is added to the mold prior to insertion of the fibers;

Fig. 8 is a detail view similar to Fig. 4 but with the broomcorn arranged within the shoulder of Fig. 6 as the hands of the broom maker spread the corn both to arrange it in the mold and to mix and coat the ends of the corn with the liquid casting resin;

Figs. 9 and 10 are related side and cross section detail views of a broom as it appears during the curing step with the clamp attached and the other elements in place;

Fig. 11 is an enlarged cross sectional detail of a finished broom showing the intimate contact of the casting resin with the rough surfaces of the broomcorn and handle, this view further showing the manner in which a small lateral aperture in the handle is partially filled with the resin more firmly to bond the resin to the handle; and Figs. 12, 13, and 14 are related end on views of three exemplary forms which the one time use cup-shaped flexible plastic shoulder mold and cover may take prior to fabrication of the broom, it being noted that each said shoulder mold and cover will assume the initial cup-shaped position shown in Fig. 6 while the broomcorn is added and the position shown in Fig. 11 after the broom is completed.

As previously explained, the particular broom or brush which has been selected for purposes of illustration and description in this disclosure is a conventional household or industrial broom utilizing broomcorn as the fiber. Broomcorn is a tall sorghum which has a jointed stem bearing a stiff branched elongated panicle used for making brooms and brushes. In the broom making art, the coarse or thicker portions of the broomcorn are referred to as stocks and the more thin, flexible upper end portions are referred to as fines. In all conventional broom factories, the fines are separated from the stocks yet both are utilized in building up a broom. Thus, the stocks form the central semi-rigid structural core of the broom while the fines cover the outside both for decorative purposes and to give a cleaner, more uniform sweep. In the drawings, I have assigned the reference numeral 15 to the fines and the reference numeral 16 to the stocks. In actual practice, however, it will be recognized that this division is only an approximation. Many of the stocks branch out and thus terminate in thin or fine tips. This basic understanding has been illustrated in Figs. 1 and 11 of the drawings.

In forming a broom in accord with my improved method, I utilize a minimum number of structural elements both to decrease the cost and to simplify the operation and product. To this end, I employ a more or less conventional wood handle 17 having a tapered end 18 and an intermediate converging shoulder portion 19 (see Fig. 11). This handle is proportioned so as to fit within and to conform sealingly to an aperture 20 which is formed through the bottom of a plastic shoulder member 21.

The mold and cover herein referred to as the shoulder 21, in turn, has an open mouth 22 and preferably is formed somewhat in the form of a cup from a thermoplastic such as polyethylene, butyrate, a vinyl, or, preferably, a cellulose acetate. With this shape, the handle 17 can be inserted into the aperture 20 thereby closing and sealing the same. The shoulder thereinafter will define a fluid tight mold which can be used one time only. However, at this point it should be noted that the shape of the shoulder or mold with which I am concerned is that shape which it assumes firstly when the broomcorn is inserted and secondly after the broom is completely assembled. To this end, the shoulder may be formed in any one of the three configurations illustrated in Figs. 12 to 14 inclusive, these figures illustrating the form prior to insertion of the broomcorn. For example, the closed mouth design 21a of Fig. 12 is preferable where it is desired that the elasticity in the plastic shoulder itself be sufficient to retain the broomcorn or fiber in a broom shape during curing without the use of clamps or the like. The mouth of the shoulder 21b illustrated in Fig. 13, on the other hand, requires a mechanical aid to hold it open while the broomcorn is inserted and a second mechanical aid to squeeze or compress it together while the resin is cured. In the open mouth design 21c of Fig. 14, no mechanical aid is needed while the broomcorn is inserted. However, a clamp or the like must be employed while the resin is cured in order to reset the form of this shoulder and cause it to reset and thus to conform to the sides of the broomcorn after curing.

As examples of the various mechanical aids which may be employed in the practice of my method, Figs. 5 and 10 illustrate a clamp with and without a vise respectively. The illustrated clamp 23 is used with the mold forms 21b and 21c. It is a self locking type which is dependent upon friction to hold it closed. This clamp is machine closed by a vise 24 having a special jaw as illustrated in Fig. 5. The special jaw locks the clamp as it is squeezed together. In similar manner, the mechanical aid which is required to hold the designs 21a and 21b of Figs. 12 and 13 in an open position during insertion of the corn consists of a pair of laterally movable jaws 25 which are shown in Figs. 6 and 7. These squeeze the ends of the shoulder causing the sides to bulge out as shown in Fig. 6. With the form illustrated at 21a in Fig. 12, of course, the sides first must be given an initial outward bend with the fingers or a mechanical aid if the final shape is to be that shown in Fig. 6 when the broomcorn is inserted.

Referring more particularly to Figs. 1 to 4 inclusive, I have illustrated the manipulative steps of a method for assembling the fines and the stocks 15 and 16 prior to inserting the resultant cylindrical mass into the oblong mold which is defined by the shoulder shown in Fig. 6. To this end, I provide an open ended tray 26 upon which the fines 15 are spread out in parallel in a pile which is more wide than it is high. Thereinafter, the stocks 16 of the broom corn are arranged in a mound parallel to and on top of the middle of the pile of fines. The ends of both the fines and stocks overlie the open end of the tray 26 to allow the hands of the broom maker to grasp the same. By forming both hands into an open or semicircular shape, the broom maker then can reach under and about the fines and, with a wrapping motion, gather them together about the stocks. This defines a substantially cylindrical mass with the stocks 16 in the middle and the fines 15 around the outside as illustrated in Figs. 3 and 4. Thereinafter, the cylindrical mass can be inserted down into the shoulder as will be described hereinafter.

Transferring attention for a moment to the shoulder and handle illustrated in Figs. 6 and 7, it will be seen that the handle is inserted into the aperture 20 prior to assembly of the broomcorn. To this end, the tapered shoulder 19 defines a tight force fit with the ferrule surrounding the aperture 20 through the bottom of the shoulder. This tight fit seals the aperture against possible leakage of the liquid resin which is to be added. With the handle in place, the hollow shoulder is arranged with the open mouth vertically above the bottom to define a mold. In actual practice, I employ a bracket to hold the shoulder in this position immediately adjacent the vise and jaws illustrated in Figs. 5 and 6. Thus, where one of the forms of Fig. 12 or 13 is employed, the jaws 25 are caused to push inwardly upon the ends of the shoulder opening it up to the position of Fig. 6. On the other hand, where a shoulder such as 21c in Fig. 14 is employed, the jaws 25 may be eliminated since the mouth is open to begin with.

With the handle projecting into the hollow interior of the shoulder and sealing the aperture 20, I pour a measured amount of the liquid thermosetting polyester casting resin into the mold. The approximate level of this resin is indicated at 27 in Fig. 7 where it will be noted that the end of the handle 18 is immersed in and is in intimate bathing contact with the resin. As the next step, the cylindrical mass of fines and stocks illustrated in Figs. 3 and 4 is given an initial thrust down into the liquid resin. At the same time or just prior to contact of the resin with the butt ends of the broomcorn, I squeeze the cylinder with the thumbs and fingers as illustrated in Fig. 8. This causes the mass of corn to spread laterally and to assume more nearly the shape of the oblong mold or shoulder itself. At the same time, it serves another function in that the lower ends of the broomcorn are thrust laterally as the tops are squeezed. This more thoroughly immerses and mixes the lower ends with the liquid resin as is essential to a firm bond. Stated differently or as another separate step, the broom maker releases his grip upon the corn and grips the corn near the top of the fibers. This further spreads the base or bottom portions of the corn out around the periphery of the mold. A clamp 23 then is placed over the shoulder in an open position and the jaws of the vise 24 are employed to close this clamp about the shoulder. The precise position of the clamp 23 is best illustrated in Fig. 9 and the resultant flattening of the broomcorn is best illustrated in Fig. 10. In actual practice, the broom maker helps the clamp to compress the corn and spread it laterally by manipulating with his fingers and further spreading the corn laterally across the mold. In final result, this causes the corn to assume the position shown in Fig. 9 which is, of course, a typical upright broom shape. Further, the various hand manipulations or their equivalent with a machine assure an intimate mixture of the corn and resin.

After the clamp has been applied, the broom is placed in a rack where it is held in the perpendicular position to allow the resin to cure on a horizontal plane with relation to the finished product. When the rack has been filled with brooms ready to be cured, it is rolled to a curing room where an exemplary cure may require four hours at a temperature of 130° F. I particularly draw attention to the point that the curing temperature is only exemplary since, of course, different broom makers may employ different brands or mixes of thermosetting casting resins. These particular polyester casting resins have very little shrinkage during curing and thus form a better bond with the corn and handle. They are well suited to the process or method above described since exposure to alkalies, acids, or extreme temperature has little or no effect once they have set up. Furthermore, being liquid they are of practical utility and the use of various catalysts and accelerators allows a good control of potlife, curing period, and the like. In the specification and claims, I refer to a "casting resin." This is a classificatory term used in the plastic art to define a thermosetting resin that may be cured at room temperature to form hard, tough tools and dies for stamping out metal sheet parts and for other tooling purposes. Said casting resins retain their shape and dimensional stability, setting without by-product formation and with little shrinkage. The polyester casting resins above identified are exemplary.

Referring more particularly to Fig. 11, it will be noted that I have applied the reference numeral 28 to the solidified plastic resin above identified. After microscopic cross section studies, I have become convinced that the solidified resin is bonded to the fibers and handle more by a mechanical adhesion than by a chemical adhesion. That is to say, the very limited contraction of this resin allows the solid mass to follow quite closely the surface irregularities around the broomcorn or other fiber and about the handle. In addition, I also employ a lateral aperture 29 which pierces the handle and, during the casting process, partially fills with the resin. Upon curing, this portion of the resin forms two short fingers which reach partially through the aperture thereby more firmly bonding the resin to the handle itself.

Returning now to the process or method of forming my improved broom, the racks are left in the curing room for the required period. During this curing process at an elevated temperature, the thermoplastic shoulder 21 yields or flows slightly thereby being reformed by the clamp 23 and the mass of resin and fibers. That is to say, I prefer to employ a shoulder which is formed of a cellulose acetate thermoplastic having a medium soft durometer test such that the elevated temperature of curing will allow the shoulder to be reshaped yet the finished product will not mar furniture. Accordingly, after the casting resin is cured to a solid, either the curing room temperature is dropped or the rack full of brooms is wheeled to a location at room temperature or at a somewhat lower temperature to allow the shoulders to cool. After the shoulders have cooled, the clamps 23 may be removed and the shoulders then will retain the new shape which they have been caused to assume. However, at this point, it is important to note that the mass of casting resin does not stick or adhere to the shoulder itself. Instead, as shown in Fig. 11, it is the transversely bulbous enlarged cross sectional configuration of the mass of handle, resin, and broomcorn which when cooled and hardened supports and stretches the shoulder or cover member transversely distorted in a plane normal to the section here shown and prevents detachment or loss of the shoulder. That is to say, the resin and broomcorn bulge out adjacent a more or less central point. The mass of resin and the shoulder thus both have a dimension which is greatest adjacent the end of the handle and both have tapered or narrowed sides as shown in Fig. 11. These tapered sides converge in both directions away from the tip of the handle thereby retaining the shoulder in place without a bond. Were the shoulder cut away on a finished broom, of course, the broomcorn still would remain bonded to the handle and it could conceivably be used as a broom. However, I prefer to utilize shoulders 21 which are brightly colored thereby lending decorative appeal to the finished broom in addition to providing a utility closely akin to a bumper. With a low durometer plastic shoulder, this bumper allows the broom to come in contact with furniture and the like without marring the same. On the other hand, were the resin mass which holds the broomcorn to the handle to come in contact with furniture, it conceivably could mar, scratch, or dent that furniture. For these reasons, the shoulder is left in place.

In summary of the method for securing the handle to the fibers of a broom or brush by employing the one time mold which is the shoulder, I practice several steps in sequence. Firstly, I mount the hollow cellulose acetate thermoplastic shoulder 21 such that the open mouth 22 is above the closed bottom having an aperture 20 therein. This defines a mold which will be used to receive the resin and which is not intended for reuse as with a metal mold. Secondly, or before the shoulder mold is arranged in the vertical position, the wood handle 17 is inserted through the aperture 20 to a point where at least a portion of the tip or end 18 projects into the hollow interior and seals the aperture 20. Thereinafter, a preselected quantity of the liquid thermosetting polyester casting resin 28 is poured into the mold and the ends of a quantity of the broomcorn 15, 16 are immersed into the liquid resin. The broomcorn or fibers then are spread laterally to define an approximate broom or brush shape with the liquid resin in intimate contact with the base of each fiber. The open mouth of the mold then is compressed (as with the clamp 23) about the fibers above the level of the resin to a point where the narrow dimension of the mouth is less than the same dimension of the bottom of the mold. While maintaining this compression, the entire mass is heated and cured with the mold in an upright position in order to form a solid mass which bonds the handle to the fibers through the medium of the solidified resin. Lastly, the broom is cooled before removing the compression in order to set the thermoplastic mold in the compressed shape thereof so as to define a shoulder bumper.

As concerns the manipulation of the broomcorn itself (illustrated in Figs. 1 to 4 and 8), I first spread a quantity of the fines 15 out in parallel in a tray 26 to form a pile which is more wide than it is high. Secondly, I arrange the stocks 16 of the broomcorn in a mound parallel to and on top of the middle of the pile of fines as illustrated in Figs. 1 and 2. The broom maker then gathers the stock and fines together with a motion which wraps the fines around the stocks defining a substantially cylindrical mass with the stocks in the middle and the fines on the outside. One end of the gathered mass of broomcorn then is inserted in the oblong mold 21 containing a liquid casting resin 28 and the corn is spread laterally to mix and coat the ends with the liquid.

The finished product which is the result of this method includes an elongated wood handle member 17 which terminates in a broom shaped mass of fibers or the like bonded to the handle. The bond itself is formed by a solidified mass of thermosetting polyester casting resin 28 which encompasses and is in intimate contact with the end portion 18 of the handle and with each of the broom fibers. A thermoplastic cellulose acetate shoulder 21 overlies and encircles but is not bonded to the resin 28 in order to define a bumper for the broom. Referring to the cross section of Fig. 11, the mass of resin and shoulder can be seen to have a dimension which is greatest adjacent the end of the handle but which tapers and thus retains the shoulder in place without a bonding of the shoulder to the resin. In use, the shoulder 21 itself is soft and pliable so as to promote flexing of the broom fibers when the broom is used. In addition, where desired, the handle 17 can be formed with a lateral aperture 29 in which a small quantity of the liquid resin 28 will be trapped thereby more firmly bonding the resin to the handle in the finished product.

Commercially, the above described process or method can be used in substantially any existing broom factory. This commercial use is practical for a variety of reasons, not the least important of which is that both the fines and the stocks of the broomcorn can be employed in the same proportion as with handmade, sewn and wire bound brooms. With the previous or conventional handmade broom, four broom makers and sewers working at top speed could produce only as many brooms as a single broom maker can produce with the above described method. This results in a substantial saving in the cost of labor and, since the materials used in a handmade broom and in my improved broom are substantially identical in cost, the final sale price of the broom materially is reduced. Still further, the broom which is produced by the above process is stronger and more appealing to the eye as well as being resistant to extreme temperatures, alkalies, and acids.

I claim:

1. A broom having a flexible, plastic inverted cup-shaped mold and cover member having an open material receiving and confining mouth; a plurality of broom fibres arranged in a bundle with one end thereof bonded into a relatively rigid head within said mold and cover member, said head being composed of a casting resin and said fibres and disposed wholly within the mouth of said cup-shaped mold and cover member, and a transversely bulbous enlarged section at the base of the fibres by which shape said head stretches and supports said mold and cover member transversely distorted in a plane normal to the transverse bulbous enlarged section, whereby the cover portions surrounding the mouth thereof yieldably embrace and confine the bristles adjacent said head.

2. The device of claim 1 in which said casting resin is a polyester type resin.

3. The device of claim 1 in which a handle projects through the base of said cup-like cover member and the projecting portion is embraced by said casting resin and locks the handle therein.

4. The method of making a broom which includes the steps of supporting an open-mouthed flexible yieldable cup with the mouth opened and facing upwardly; filling the cup with a predetermined amount of casting resin; inserting a predetermined amount of bristles through said open mouth and into said casting resin; clamping the cup, while supported as aforesaid, to hold the bristles in an elongated section normal to the axis of the bristles to press the mouth of said cup against said bristles and to form the closed end of said cup into a shape having a thicker cross section than the cross section normal to said elongated section; and curing and setting said casting resin while the cup is so held whereby said cup serves as the mold for the molding step and the thicker molded end serves thereafter to hold the cup on the bristles when the brush is in use.

5. The method of making a broom which includes the steps of supporting an open-mouthed flexible yieldable cup with the mouth opened and facing upwardly; inserting a predetermined amount of bristles through said open mouth and into said cup; introducing a predetermined amount of casting resin into said cup; clamping the cup, while supported as aforesaid, to hold the bristles in an elongated section normal to the axis of the bristles to press the mouth of said cup against said bristles and to form the closed end of said cup into a shape having a thicker cross section than the cross section normal to said elongated section; and curing and setting said casting resin while the cup is so held, whereby said cup serves as the mold for the molding step and the thicker molded end serves thereafter to hold the cup on the bristles when the brush is in use.

References Cited in the file of this patent

UNITED STATES PATENTS

| | | |
|---|---|---|
| 1,549,768 | Hollensbe | Aug. 18, 1925 |
| 2,059,530 | Lay | Nov. 3, 1936 |
| 2,070,448 | Nork | Feb. 9, 1937 |
| 2,417,750 | Hall | Mar. 18, 1943 |
| 2,458,920 | Wheeler et al. | Jan. 11, 1949 |
| 2,696,628 | Smith | Dec. 14, 1954 |
| 2,854,684 | Hardman et al. | Oct. 7, 1958 |